Oct. 26, 1954

J. C. CARTER 2,692,609

FUELING SYSTEM

Filed March 12, 1949

INVENTOR.
JAMES COOLIDGE CARTER
BY
Kenyon & Kenyon
ATTORNEYS

Oct. 26, 1954

J. C. CARTER 2,692,609

FUELING SYSTEM

Filed March 12, 1949

INVENTOR.
JAMES COOLIDGE CARTER
BY
Kenyon & Kenyon
ATTORNEYS

Patented Oct. 26, 1954

2,692,609

UNITED STATES PATENT OFFICE 2,692,609

FUELING SYSTEM

James C. Carter, Pasadena, Calif., assignor to The J. C. Carter Company, Pasadena, Calif., a corporation of California Application March 12, 1949, Serial No. 81,185

14 Claims. (Cl. 137—235)

This invention relates to a fueling system and more particularly to a fueling system including a combined float-operated and pressure-sensitive control device.

This invention is particularly adapted to be used with a fueling nozzle for under-wing fueling of aircraft such as is shown in my copending application Serial No. 705,545, filed October 25, 1946, now Patent No. 2,653,832 granted Sept. 29, 1953, and in the embodiment shown herein cooperates with the fueling nozzle of that application.

The industry has long sought a simple, reliable, compact, lightweight and efficient safety device for use with aircraft fuel tanks. This is particularly important in the case of aircraft fuel tanks fueled from their lower surface, especially since the advent of larger transport aircraft with fuel capacity of 5,000 gallons or more and the increased height of aircraft wings from the ground has begun to make under-wing fueling a standard practice. The absence of a fueling opening atop the fueling tank makes it mandatory, however, that some means be provided for preventing additional fuel from being forced into the tank after the tank is filled or if, for some reason, the pressure of the fuel in the tank exceeds a predetermined limit of safety.

Accordingly, one object of this invention is to provide a fueling system for under-wing fueling of aircraft which is responsive to a float-operated control device to prevent the aircraft fuel tank from being overfilled.

Another object of this invention is to provide such a fueling system which is also responsive to a pressure-sensitive control device to prevent the tank from being further filled if the pressure in the tank exceeds a predetermined value.

Another object of this invention is to provide a combined float-operated and pressure-sensitive device which is simple, reliable, compact, efficient and of light weight for mounting in conjunction with aircraft fuel tanks to cooperate with the fueling system thereof.

A further object of this invention is to provide such a combined float-operated and pressure-sensitive device in which a diaphragm is employed both to react to the pressure and to serve as a mounting and pivot for the float-operated device.

Still a further object of this invention is to provide such a device in which the diaphragm is suitably reinforced to prevent distortion laterally of the diaphragm so that the device will be supported in proper position for operation either by pressure or the float and specifically such a device in which the diaphragm is made of a material suitable for use in a fuel tank and in which the reinforcing member, which is preferably metallic screening, is embedded in the material of the diaphragm for protection.

Other and further objects will appear during the course of the following description when taken with the accompanying drawings, in which.

Figure 1:
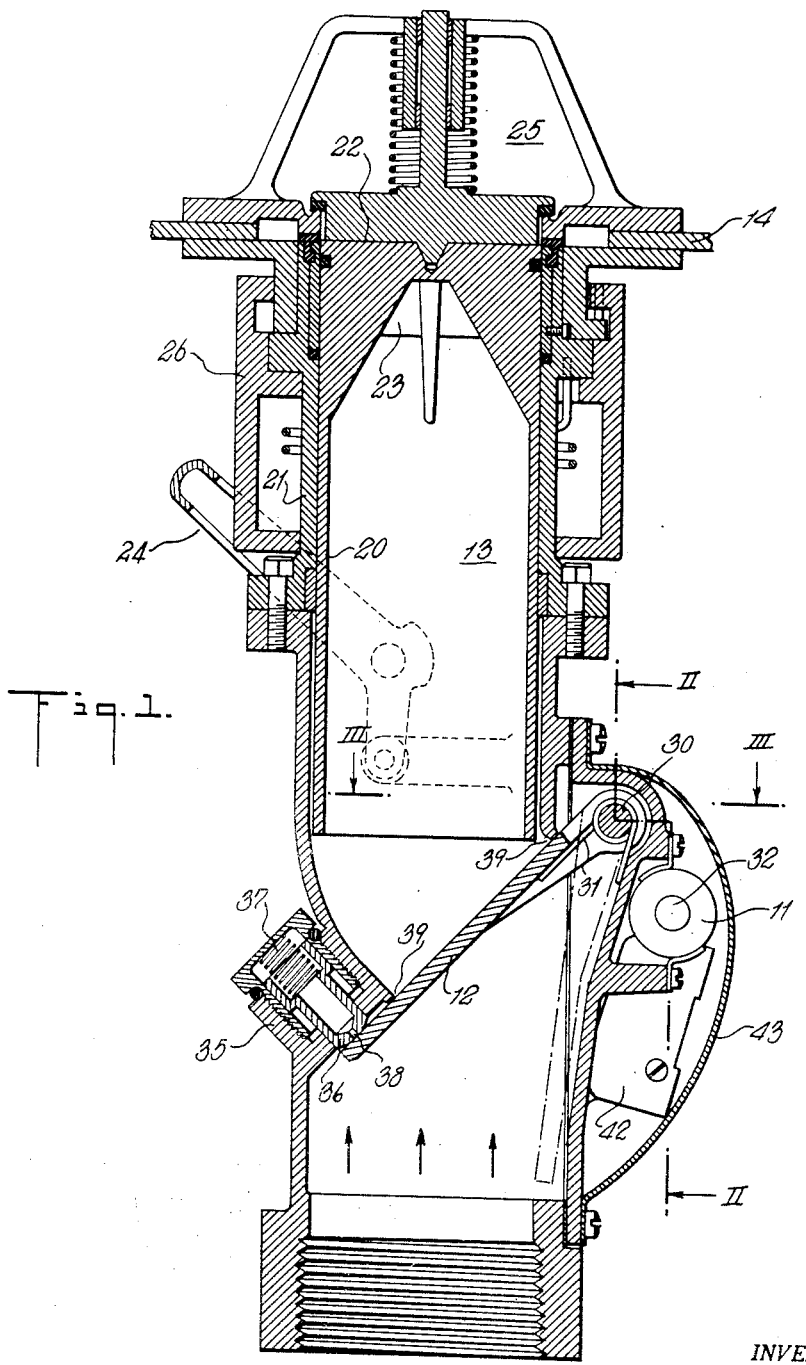
Fig. 1 is a cross-sectional view of a fueling tank valve and a fueling nozzle embodying the fueling shut-off feature of this invention.

Briefly, my invention includes a combined float-operated and pressure-sensitive control device mounted in conjunction with a fuel tank and controlling a shut-off valve mounted in the fueling nozzle for the tank. In the preferred embodiment shown the combined float-operated and pressure-sensitive device is a switch 10 which controls a solenoid 11, solenoid 11 in turn actuating a spring-biased shut-off valve 12 mounted on and cooperating with fueling nozzle 13. Fueling nozzle 13 is adapted for under-wing fueling of the fuel tank 14. The invention of the fueling nozzle itself does not form a part of this application, but is fully described and claimed in my above copending application Serial 705,545, filed October 25, 1946.

As shown in Fig. 1, and more fully described in the above copending application, fueling nozzle 13 comprises an inner telescoping member 20 and an outer telescoping member 21. Inner telescoping member 20 is provided with a closed terminal end 22 and lateral ports 23 adjacent thereto, these ports 23 being exposed when inner member 20 is forced out of outer member 21 as by means of handle 24. Fueling nozzle 13 is adapted to be engaged with a cooperating valve 25 of fuel tank 14 by means of the bayonet member 26. Valve 25 is spring-loaded as shown and adapted to be opened to permit access of fuel to the tank when inner member 20 is forced out of outer member 21 after the fueling nozzle has been secured in cooperating relation by means of bayonet member 26.

Figure 2:
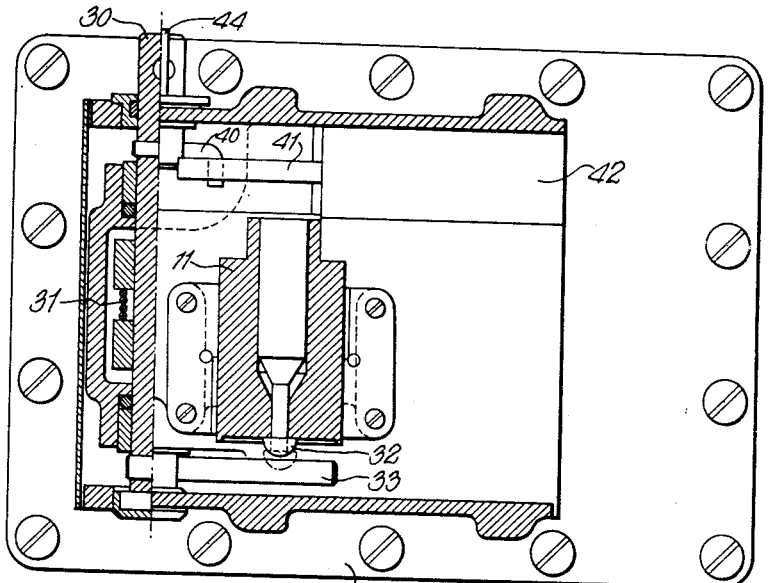
Fig. 2 is a cross-sectional view taken along line II—II of Fig. 1.
Figure 3:
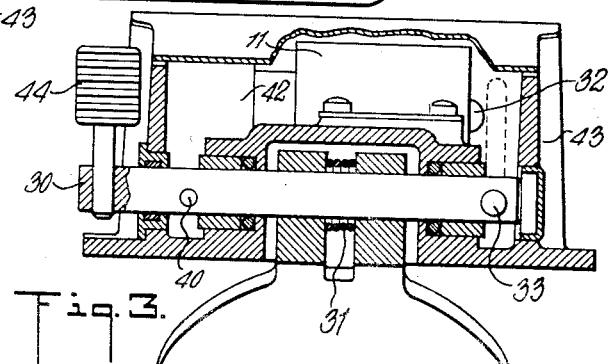
Fig. 3 is a cross-sectional view taken along line III—III of Fig. 1.

In the nozzle shown, even though inner member 20 is forced out of outer member 21, the flow of fuel through the fueling nozzle 13 may be prevented by means of shut-off valve 12, whose flap shape is shown more clearly in Fig. 3. Flap valve 12 is pivoted at one end by means of shaft 30 and biased by means of spring 31 so as normally to prevent the flow of fuel through the nozzle. While spring 31 is sufficiently strong to close valve 12 in the direction of normal fueling flow, it is to be noted that it is not so strong as to interfere materially with reverse flow, such as is encountered when de-fueling an aircraft. It is still possible to overcome the pressure exerted by spring 31 to open the nozzle with a full or partially full tank and drain the tank 14 through the nozzle 13. A solenoid 11 is provided whose plunger 32, as shown more clearly in Fig. 2, when in its energized position engages or latches a projecting arm 33 extending from shaft 30 so as to maintain valve 12 in the open position indicated by the dotted lines in Fig. 1, thus allowing free flow of fuel through the nozzle valve. When the solenoid 11 is de-energized, as in the position shown in full lines in Fig. 2, the semi-spherically shaped end of the plunger 32 no longer engages the projecting arm 33, and spring 31 then forces valve 12 down into the path of the flowing fuel, indicated by the arrows in Fig. 1. The fuel flowing thus aids in the rapid closure of valve 12 and prevents further flow of the fuel through the nozzle 13.

A dashpot mechanism 35 is provided for valve 12 comprising a spring-loaded piston 36 which fits somewhat loosely in its chamber and thus retards the action of the valve 12 in reaching its fully closed position until the piston 36 can be forced upward against the combined action of the spring 37 and the fuel trapped above the piston. A small aperture 38 is provided as shown for allowing the dashpot piston 36 to quickly return to its extended position under the force of the compression spring 37 when the flap valve 12 is moved away from its closed position.

It is to be noted that the seal between flap valve 12 and its seat at 39 is a metal-to-metal seal, and thus a sufficient amount of fluid can eventually flow around the valve 12 from the source even after the valve is in its closed position to equalize the pressure on both sides of the valve 12 and thus allow easy movement of this valve on its pivot shaft 30 as desired.

In Figs. 2 and 3 is shown in more detail the control mechanism for the flap valve 12. At the other end of shaft 30 from that on which projecting arm 33 is mounted is provided another projecting arm 40 which is preferably L-shaped to engage the actuating arm 41 of switch 42. The control unit thus far described is enclosed in a sealing enclosure 43 but with one end of shaft 30 adjacent projecting arm 40 extending through the wall thereof as shown. A thumbpiece 44 is provided and secured to the projecting end of shaft 30 without the enclosure 43 for moving the flap valve 12 to its open position, indicated by the dotted lines in Fig. 1. When the flap valve 12 is moved to this open position by means of the thumbpiece 44, the L-shaped projection of projecting arm 40 engages the actuating arm 41 of switch 42, thus actuating the latter to energize the solenoid 11 providing the remainder of the actuating circuit is also completed, as will be discussed more fully in connection with the description of Fig. 4. As previously described, projecting arm 33 is brought into such a position that the semispherical projecting end of plunger 32 of solenoid 11 can then extend thereunder, thus latching flap valve 12 in its open position against the action of spring 31 even when the manual pressure is removed from the thumbpiece 44.

It is to be noted that due to the semi-spherical camming shape of the end of plunger 32 it is possible to operate manually thumbpiece 44 in the opposite direction to override the solenoid latch and thus provide an emergency means of shutting off the fluid flow manually without using the time and effort required to close the nozzle 13 by means of the normal operating handle 24.

Figure 4:
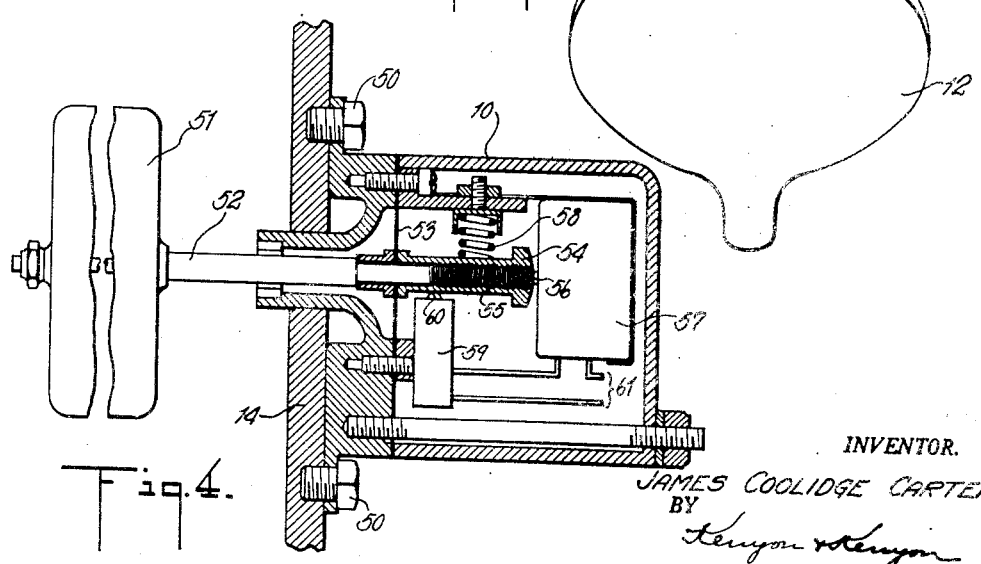
Fig. 4 is a cross-sectional view of a combined float-operated and pressure-sensitive control device according to this invention.

In Fig. 4 is shown the combined float-operated and pressure-sensitive device which controls the operation of flap type valve 12. As shown, this device is mounted in a suitable place in the wall of the fuel tank 14, as by means of machine screws 50, and includes a float 51 which extends within the fuel tank and is responsive to the fuel level. Spindle 52 is attached to float 51 and extends through and preferably at right angles to a flexible diaphragm 53. On the free end of spindle 52 is screwed a member 54, including a laterally adjustable element 55, which contacts actuating element 56 of actuating device or switch 57. A compression or coil spring 58 is provided above the spindle 52-member 54 arrangement, this coil spring being adjustable as shown in order to compensate for the weight of the float 51. A second actuating device or switch 59 is provided below the spindle 52-member 54 assembly and has its actuating member 60 abutting the member 54 laterally thereof in the manner illustrated. Switches 57 and 59 are connected in series as shown and their output terminals 61 then connected in series with switch 42 and solenoid 11 (Figs. 1, 2 and 3) and a suitable source of energy (not shown). Switches 57 and 59 are normally closed and switch 42 normally open in the absence of a movement of their respective actuators 56, 60 and 41, respectively. Thus, when thumbpiece 44 (Figs. 2 and 3) is moved to place flap type valve 12 in its open position, the circuit to solenoid 11 is completed and its plunger 32 moved to a position where it engages the projecting arm 33, thus latching valve 12 in that position. Thereafter, when the fuel level in the tank 14 reaches a predetermined level, the float 51 starts to rise, pivoting the spindle 52-member 54 assembly about the plane of flexible diaphragm 53 and depressing the actuator 60 of switch 59 to open the solenoid 11 energization circuit. This allows the flap type valve 12 to return to its closed position under the influence of spring 31 as described above. Similarly, if the pressure in the fuel tank 14 rises above a predetermined value, determined by the stiffness of the diaphragm 53 and the positioning of adjustable member 55, actuator 56 of switch 57 is depressed, again opening the energization circuit to solenoid 11 and allowing the flap type valve 12 again to close.

I have found that very good results are obtained by making diaphragm 53 of a laminated structure which is impervious to common fuel such as gasoline. Preferably, this diaphragm is formed of a layer of metallic screening sandwiched between two layers of fluid-resistant synthetic rubber, such as "Thiokol," which is not deleteriously affected by gasoline or the like. This forms a reinforced structure which resists lateral deformation and thus functions well as a pivot member for spindle 52, while allowing transverse deformation and thus acting as a diaphragm in the conventional manner.

Preferably, switches 42, 57, and 59 are of a type wherein only a very limited movement of their respective actuators 41, 56, and 60, respectively, is necessary to cause their operation. One type of such switches is marketed under the trade name "Micro switch."

Numerous additional applications of the above-described principles will occur to those skilled in the art and no attempt has here been made to exhaust such possibilities. The scope of the invention is defined in the following claims.

I claim:

1. A fueling system for a fuel tank comprising the combination of a combined float-operated and pressure-sensitive control mounted adjacent the fuel tank and including a flexible diaphragm having a reinforcement disposed to allow transverse deformation of said diaphragm and resist lateral deformation thereof, a first actuating device mounted transversely of said diaphragm for actuation in response to transverse deformation of said diaphragm, float means positioned within said tank, a spindle connected at one end thereof to said float means and fixed at the other end thereof to one face of said diaphragm, means operatively associated with said diaphragm and engaging said first actuating device to operate the same and for operating a second actuating device, including an extension of said spindle fixed to the other face of said diaphragm, said second actuating device mounted on the other side of said diaphragm from said float means and bearing laterally upon said extension for actuation in response to movement of said float member and the resulting pivoting of said spindle and spindle extension about the plane of said diaphragm, and a shut-off valve for controlling the flow of fuel into said fuel tank and valve controlling means connected to said valve and operatively associated with both said first and second actuating devices of said control for operation thereby whereby the flow of fuel is controlled by either transverse distortion of said diaphragm or by the aforesaid pivoting of said spindle and spindle extension about the plane of said diaphragm.

2. Apparatus according to claim 1 including a solenoid having a plunger mounted to latch said shut-off valve in its open position and wherein each of said actuating devices comprises a switch controlling the energization of said solenoid.

3. Apparatus according to claim 2 wherein said shut-off valve comprises a flap-shaped member pivoted adjacent one end thereof, a spring biasing said flap-shaped member toward its closed position, and a projecting arm for said shut-off valve positioned to be engaged by the plunger of said solenoid to thereby maintain said shut-off valve in its open position when said solenoid is energized.

4. Apparatus according to claim 3 including a dashpot mechanism mounted adjacent the free end of said flap-shaped member for slowing the movement of said member as it approaches its fully closed position.

5. Apparatus according to claim 1 wherein said shut-off valve has an engaging member and including a solenoid mounted adjacent said engaging member and having a plunger with a latching portion comprising a cam surface to engage said engaging member in normal operation to latch said shut-off valve in its open position but allowing said shut-off valve to be moved to its closed position by forcing said engaging member to over-ride said cam surface and wherein each of said actuating devices comprises a switch controlling the energization of said solenoid.

6. Apparatus according to claim 1 in which the reinforcement is a thin member lying in and flexible in the plane of said diaphragm and resistant to deformation laterally of said diaphragm.

7. Apparatus according to claim 1 in which said diaphragm is a flexible material impervious to gasoline and in which the reinforcement is a metallic screen embedded in the material of said diaphragm.

8. A combined float-operated and pressure-sensitive control for use with a fuel tank or the like comprising a flexible diaphragm, reinforcement for said diaphragm resisting lateral deformation thereof but permitting transverse deformation thereof, a first actuating device for actuation in response to transverse deformation of said diaphragm, float means adapted to be positioned within a tank and fixed to said diaphragm, a second actuating device mounted on the other side of said diaphragm from said float means, and means operatively associated with said diaphragm and engaging said first actuating device to operate the same and for operating said second actuating device, including an actuator for said second actuating device fixed to said diaphragm for actuation in response to movement of said float member and the resulting pivoting action about the plane of said diaphragm.

9. Apparatus according to claim 8 in which the reinforcement is thin and flexible and deformable transversely of the plane of the diaphragm but not laterally of said diaphragm.

10. Apparatus according to claim 8 in which the reinforcement is a wire screen lying in the plane of said diaphragm.

11. Apparatus according to claim 8 in which the diaphragm is of material resistant to gasoline and the reinforcement is embedded in said material.

12. A fueling system for a fuel tank and a cooperating fueling nozzle comprising the combination of a combined float-operated and pressure-sensitive control mounted adjacent the fuel tank and including a flexible diaphragm having a reinforcement disposed to allow transverse deformation of said diaphragm and resist lateral deformation thereof, a first actuating device mounted transversely of said diaphragm for actuation in response to transverse deformation of said diaphragm means operatively associated with said diaphragm and engaging said first actuating device to operate the same, float means positioned within said tank, a spindle connected at one end thereof to said float means and fixed at the other end thereof to one face of said diaphragm, and a second actuating device mounted on the other side of said diaphragm from said float means and bearing laterally upon said extension for actuation in response to movement of said float member and the resulting pivoting of said spindle and spindle extension about the plane of said diaphragm, and a shut-off valve mounted in the fueling nozzle and connected to said first and second actuating devices of said control for operation thereby.

13. A combined float-operated and pressure-sensitive control for use with a fuel tank or the like comprising a flexible diaphragm, reinforcement for said diaphragm resisting lateral deformation thereof but permitting transverse deformation thereof, float means adapted to be positioned within said tank, a spindle connected at one end thereof to said float and fixed at the other end thereof to one face of said diaphragm, an extension of said spindle fixed to and projecting from the other face of said diaphragm, a first actuating device positioned to be engaged and operated by said extension of said spindle upon transverse deformation of said diaphragm, a second actuating device mounted on the other side of said diaphragm from said float and positioned to be engaged and actuated by movement of said extension of said spindle in response to movement of said float and the resulting pivoting action about the plane of said diaphragm of said float, said spindle and said extension of said spindle.

14. Apparatus according to claim 13 in which said diaphragm is of flexible material impervious to gasoline and in which the reinforcement is a metallic screening embodied in the material of said diaphragm.

References Cited in the file of this patent
UNITED STATES PATENTS

| Number | Name | Date |
|---|---|---|
| 768,984 | George | Aug. 30, 1904 |
| 923,833 | Hardwick | June 8, 1909 |
| 1,064,208 | Hardwick | June 10, 1913 |
| 1,891,758 | Eggleston | Dec. 20, 1932 |
| 2,224,190 | Loesser | Dec. 10, 1940 |
| 2,422,529 | Coffey | June 17, 1947 |